United States Patent
Zendejas-Martinez et al.

(10) Patent No.: US 8,377,168 B2
(45) Date of Patent: Feb. 19, 2013

(54) METHOD FOR THE DIRECT REDUCTION OF IRON OXIDES TO METALLIC IRON UTILIZING COKE OVEN GAS OR THE LIKE

(75) Inventors: Eugenio Zendejas-Martinez, Nuevo Leon (MX); Pablo-Enrique Duarte-Escareño, Nuevo Leon (MX)

(73) Assignee: HYL Technologies, S.A. DE C.V., San Nicolas de los Garz (MX)

( * ) Notice: Subject to any disclaimer, the term of this patent is extended or adjusted under 35 U.S.C. 154(b) by 1091 days.

(21) Appl. No.: 12/160,180

(22) PCT Filed: Jan. 5, 2007

(86) PCT No.: PCT/IB2007/001681
§ 371 (c)(1),
(2), (4) Date: Sep. 24, 2008

(87) PCT Pub. No.: WO2007/096784
PCT Pub. Date: Aug. 30, 2007

(65) Prior Publication Data
US 2009/0211401 A1    Aug. 27, 2009

Related U.S. Application Data

(60) Provisional application No. 60/757,688, filed on Jan. 6, 2006.

(51) Int. Cl.
   *C21B 13/02* (2006.01)
(52) U.S. Cl. .......................................... 75/443; 75/505
(58) Field of Classification Search .................... 75/387, 75/443–452, 505
   See application file for complete search history.

(56) References Cited

U.S. PATENT DOCUMENTS 4,054,444 A    10/1977 Clark et al.
(Continued)

OTHER PUBLICATIONS

Diemer, et al., "Potentials for Utilization of Coke Oven Gas in Integrated Iron and Steel Works" (14 pgs.)—$2^{nd}$ *International Meeting on Ironmaking / $1^{st}$ International Symposium on Iron Ore*, Sep. 12-15, 2004, Vitoria, Espirito Santo, Brazil.
The Coke Oven By-Product Plant: What is it and what does it do? (5 pgs.), (Internet: <URL: http://www.energymanagertraining.com/iron_steel/coke_oven_steel.htm>).

(Continued)

*Primary Examiner* — George Wyszomierski
*Assistant Examiner* — Tima M McGuthry Banks
(74) *Attorney, Agent, or Firm* — Frommer Lawrence & Haug LLP; A. Thomas S. Safford (57) ABSTRACT

A process for reducing iron ore particles in a moving bed reduction reactor comprising an upper reduction zone and a lower discharge zone, wherein coke oven gas, preferably forming all the make-up for the reducing gas circulating through and reacting in the reduction zone, is first fed to the discharge (and, optionally, cooling) zone and thereafter, conditioned by the DRI in the lower zone, is withdrawn from the reactor and transferred externally into the recycle reducing gas for injection into the reduction zone; with the heavy hydrocarbons and other components of coke oven gas which cause fouling, corrosion, or deposits in the direct reduction plant being removed from coke oven gas by catalytic and/or adsorptive action of the DRI in the lower zone; preferably the gas flow rate of the coke oven gas and the externally transferred gas differs between about 100 and 200 NCM per ton of DRI produced.

17 Claims, 5 Drawing Sheets

U.S. PATENT DOCUMENTS

| | | | | |
|---|---|---|---|---|
| 4,253,867 | A | * | 3/1981 | Price-Falcon et al. .......... 75/495 |
| 4,270,739 | A | | 6/1981 | Ahrendt et al. |
| 4,351,513 | A | | 9/1982 | Sanzenbacher |
| 5,407,460 | A | * | 4/1995 | Bueno et al. .................... 75/489 |
| 6,027,545 | A | * | 2/2000 | Villarreal-Trevino .......... 75/490 |
| 6,033,456 | A | * | 3/2000 | Jahnke ............................ 75/505 |
| 2005/0151307 | A1 | * | 7/2005 | Viramontes-Brown et al. ............................. 266/140 |

OTHER PUBLICATIONS

"Removing Light Oils from Coke Oven Gas" (2 pgs.), copyright, Kenneth A. Friedman, kaf3@Lehigh.edu, 6/94; (Internet: <URL: http://www.lehigh.edu/~kaf3/cchemdata/btx.html>).

Brochure: "The New Schwelgern Coke Plant" p. 15, *Uhde*; a company of ThyssenKrupp Technologies.

\* cited by examiner

METHOD FOR THE DIRECT REDUCTION OF IRON OXIDES TO METALLIC IRON UTILIZING COKE OVEN GAS OR THE LIKE

RELATED APPLICATIONS

This application is the U.S. national phase under 35 USC 371 of PCT/IB2007/001681, filed Jan. 5, 2007, and published as WO 2007/096784, on Aug. 30, 2007, claiming priority from U.S. provisional patent application No. 60/757,688, filed Jan. 6, 2006.

FIELD OF THE INVENTION

The present invention is related to the direct reduction of iron oxides to produce direct reduced iron (DRI) also known in the industry as sponge iron. More specifically, the present invention is directed to improvements in the operation of direct reduction reactors whereby a methane-containing gas, preferably coke oven gas (COG), is utilized as the process gas for reducing the iron oxides. All the COG needed for reduction of the iron oxides is caused to flow through a portion of the bed containing DRI, generally below the reduction zone of the reduction reactor, with great technical and economical advantages. The present invention provides an improved direct reduction process whereby a direct reduction plant can be advantageously incorporated into an integrated steel making facility having coke ovens or the like.

BACKGROUND OF THE INVENTION

It is known that in the process of producing metallurgical coke for the operation of blast furnaces, coal is heated in order to eliminate most of the volatile components and preserving mostly the carbon structure. Coke is thereby provided with the physical and chemical properties which make it fit for providing energy and burden support in blast furnaces. Volatile matter of coal comprises a number of compounds which are distilled in coke ovens constituting what is known as coke oven gas.

The volume and composition of COG produced in coke ovens depends on the characteristics of the coal utilized. Raw coke oven gas coming from the coke oven battery has the following typical composition: water about 47%; hydrogen 29% to 55%; methane 13% to 25%; nitrogen 5% to 10%; carbon monoxide 3% to 6%; carbon dioxide 2% to 3%; hydrocarbons (ethane, propane etc.) 2% to 1%; and various contaminants such as tar vapors and light oil vapors (aromatics), consisting mainly of benzene, toluene and xylene (these three generally known as BTX); naphthalene; ammonia; hydrogen sulfide; hydrogen cyanide and other impurities.

Raw COG must be cooled, cleaned and treated in a number of chemical processes for separating valuable compounds such as ammonia and other petrochemicals and for removing sulfur, gums and other substances, so that it may be used as a fuel gas at the coke oven battery and elsewhere in the steelmaking plant. In the COG treatment plant, COG is cooled down to condense out water vapor and contaminants and for removing tar aerosols to prevent gas line/equipment fouling. Ammonia is also removed to prevent gas line corrosion, and naphthalene to prevent gas line fouling by condensation. Light oil is separated for recovery and sale of benzene, toluene and xylene, and hydrogen sulfide has to be removed to meet local emissions regulations.

After this treatment, COG typically has the following composition: about 61% hydrogen; about 8% carbon monoxide; about 4% carbon dioxide; about 22% methane; about 1% nitrogen; about 2% water; about 2% of hydrocarbons heavier than methane including ethylene and acetylene; about 5% BTX; and less than about 1% of hydrogen sulfide, tars and naphthalene.

Since coke oven gas has a high calorific value, it is utilized mostly for heating purposes in steel plants, but the chemical values of hydrogen and carbon monoxide can be advantageously utilized for reduction of iron ores to metallic iron for increasing the iron/steel production of steelmaking facilities.

Direct reduction processes may be utilized in the steel industry as an alternative to blast furnaces or to supplement blast furnaces by utilizing sulfur-containing coke oven gas as a way of increasing the metallic iron production. The most common type of reactor where the DRI is produced is a shaft-type moving-bed furnace, having two main sections: a reduction zone where a reducing gas is circulated at a high temperature and through which said reducing gas is recycled in a reduction circuit and a cooling zone located below the reduction zone where the DRI is cooled down to ambient temperatures before being discharged from said reactor by circulating a cooling gas containing also hydrogen and carbon monoxide in a cooling circuit.

Iron-containing particles in the form of pellets, lumps or mixtures thereof are charged to the upper part of a shaft-type reduction reactor and are reduced to metallic iron by contacting said particles with a reducing gas containing hydrogen and carbon monoxide at temperatures above 850° C.

Oxygen is removed from the iron ores by chemical reactions based on hydrogen ($H_2$) and carbon monoxide (CO), for the production of Direct Reduced Iron (DRI) having a high degree of metallization (ratio of metallic iron to total iron content in the DRI).

The overall reduction reactions involved in the process are well known and are represented below:

$$Fe_2O_3 + 3H_2 \rightarrow 2Fe + 3H_2O \qquad (1)$$

$$Fe_2O_3 + 3CO \rightarrow 2Fe + 3CO_2 \qquad (2)$$

The hydrogen and carbon monoxide transformed into water and carbon dioxide according to reactions (1) and (2) are separated from the gas stream circulating in the reduction circuit and are substituted by a make-up feed of reducing gas. The reducing gas make-up generally comes from a natural gas reformer, but according to the invention, this make-up gas is withdrawn from the gas circulating through the lower cooling/discharge zone of the reduction reactor. The DRI present in the cooling/discharge zone contributes in removing heavy hydrocarbons, BTX, tars and other undesirable compounds present in the COG, whereby these substances are not present in the reduction circuit and fouling problems in the gas heater and other equipment are avoided.

There have been several proposals for utilizing COG in direct reduction processes, for example U.S. Pat. No. 4,054,444 teaches a direct reduction process wherein methane or a methane-containing gas is introduced to the shaft furnace beneath its reduction zone for increasing the carbon content of the DRI. No specific teaching of utilizing COG is found in this patent. It is however mentioned here in connection with the broader possibility of feeding a methane-containing process gas to the cooling gas loop. The gases injected to the cooling loop in this patent are all allowed to flow upwardly through the furnace from the cooling zone to the reduction zone. This patent does not show the possibility of transferring gas from the cooling loop to the reduction loop by means of an external conduit, therefore the amount of gases which can be fed to the cooling loop are limited to the amount which does not cool down the iron-particles bed in the reduction zone.

U.S. Pat. No. 4,253,867 discloses a method of using "a hydrocarbon-containing gaseous process fuel," exemplified by COG, for reducing iron ores (wherein a mixture of COG and steam is fed to an intermediate zone located between the reduction zone and the cooling zone of the reduction reactor). Coke oven gas is reformed to hydrogen and carbon monoxide in the reforming zone taking advantage of the catalytic action of the iron and the high temperature of the solid DRI in said reforming zone. This patent does not teach the possibility of feeding all the COG needed for the reduction of iron oxides to the cooling loop nor suggests transferring gas from the cooling loop to the reduction loop through an external conduit.

U.S. Pat. No. 4,270,739 and No. 4,351,513 disclose a direct reduction process where a sulfur-containing "process fuel gas, such as coke oven gas" is desulfurized by the iron-containing particles contained in the reduction reactor by heating and injecting the COG above the reduction zone of the reduction furnace. In the '739 patent, COG is heated in a fired heater before its introduction to the desulfurizing zone and in the '513 patent, COG is heated by heat-exchange with the flue gases of a reformer. These patents do not suggest feeding the COG to the cooling loop and then transferring a major part of said COG from the cooling loop to the reduction loop by means of a conduit external to the reduction furnace (with its increased process control benefit).

Documents cited in this text (including the patents discussed herein), and all documents cited or referenced in the documents cited in this text, are incorporated herein by reference. Documents incorporated by reference into this text or any teachings therein may be used in the practice of this invention.

OBJECTS AND SUMMARY OF THE INVENTION

It is therefore an object of the present invention to provide a process and apparatus for more effectively using coke oven gas (COG) or the like in reducing iron ores to DRI in a moving bed reduction reactor.

This is accomplished in such a reduction reactor, comprised of an upper reduction zone and a lower discharge zone, wherein all the COG to be fed as make-up for the reducing gas circulating and reacting in said reduction zone is first fed to said discharge zone (preferably also functioning as a cooling zone) and thereafter such COG (now conditioned by passing through DRI in the discharge zone) is withdrawn from the reactor and then added to the reducing gas being recirculated into said reduction zone for reducing said iron ores.

Generally the present invention concerns a method for producing direct reduced iron (DRI) through the reduction of iron-oxides-containing particles to metallic iron-containing particles (DRI) in a reduction reactor, comprising a reduction zone and a lower discharge zone, by contacting said iron-oxides-containing particles with a high temperature reducing gas stream, comprising hydrogen and carbon monoxide in said reduction zone, and wherein the reduced particles (DRI) flow from said reduction zone down through said lower discharge zone; said method being characterized by the improvement comprising introducing into and circulating a methane-containing process gas through said lower zone including through the DRI therein; withdrawing from the reactor at least a portion of the gas flowing in said lower zone; transferring externally of said reactor at least a first portion of such gas withdrawn from said lower zone; combining such first portion of said withdrawn gas with an at least partially regenerated reducing gas effluent being recycled back to the reduction zone; feeding such combined gases together into the reduction zone of said reactor; and controlling the flow rate of said methane-containing process gas so as to be greater than the flow rate of said transferred portion of said withdrawn gas by between about 50 normal cubic meters and about 300 normal cubic meters per metric ton of DRI produced in said reduction reactor.

The present invention concerns a method for producing direct reduced iron (DRI) through the reduction of iron-oxides-containing particles to metallic iron-containing particles in a reduction reactor, comprising a reduction zone and a lower cooling discharge zone, by contacting said iron-oxides-containing particles with a high temperature reducing gas stream, comprising hydrogen and carbon monoxide in said reduction zone, and wherein the reduced particles flow from said reduction zone down through said lower discharge zone; said method being characterized by the improvement comprising introducing into and circulating a methane-containing process gas in the form of coke oven as containing benzene, toluene and xylene (BTX), tars and other contaminants through said lower zone including through the bed of direct reduced iron therein;

withdrawing from the reactor at least a portion of the gas flowing in said lower zone;

transferring externally of said reactor at least a first portion of such gas withdrawn from said lower zone;

combining such first portion of said withdrawn gas with an at least partially regenerated reducing gas effluent being recycled hack to the reduction zone;

feeding such combined gases together into the reduction zone of said reactor; and controlling the flow rate of said methane-containing process gas so as to be greater than the flow rate of said transferred portion of said withdrawn gas by between about 50 normal cubic meters and about 300 normal cubic meters per metric ton of direct reduced iron produced in said reduction reactor.

DESCRIPTION OF PREFERRED EMBODIMENTS OF THE PRESENT INVENTION

Figure 1:
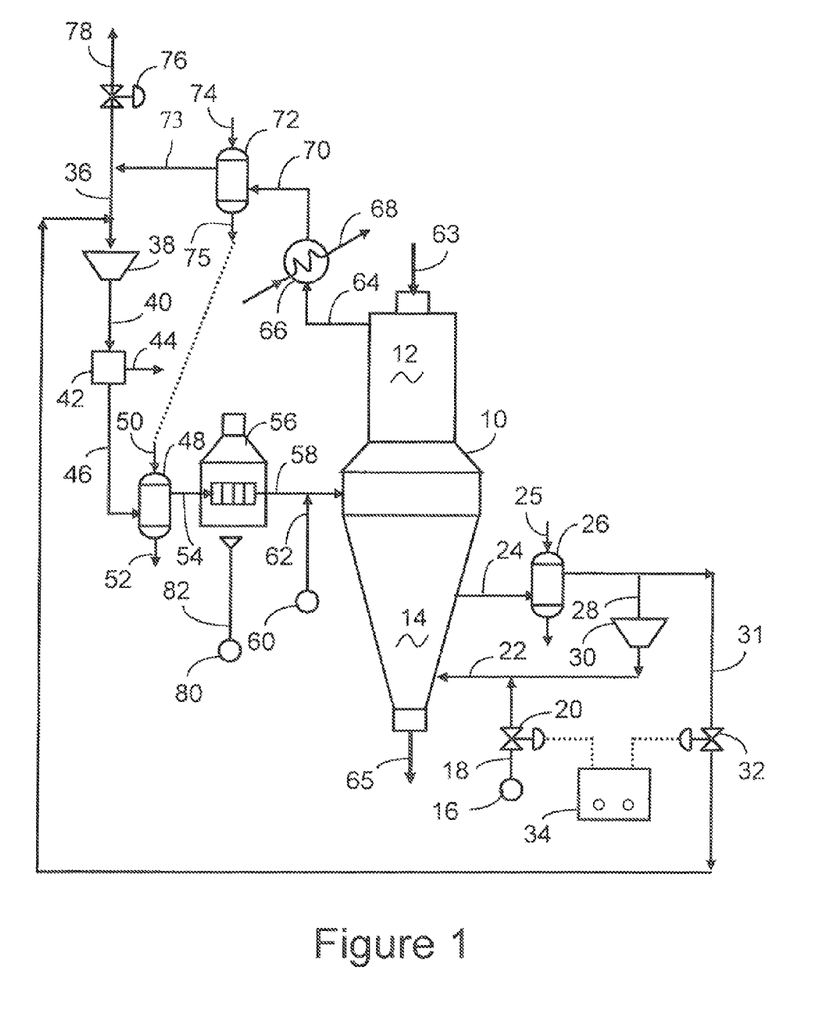
FIG. 1 shows a schematic process diagram wherein COG is utilized in a direct reduction process without a reformer and where the heat-content of the reducing gas effluent from the direct reduction reactor is used for producing steam.

With reference to the appended figures, where same numerals designate same elements of the method and apparatus of the invention, and more particularly to FIG. 1, numeral 10 generally designates a direct reduction reactor of the moving-bed shaft type, having an upper reduction zone 12 and a lower discharge zone 14. Zone 14 can optionally also be adapted to function as a cooling zone. COG from a suitable source 16 is fed through pipe 18 to the cooling zone 14 through pipe 22. Typically, the source 16 supplies pre-conditioned COG, from which many of the contaminants and certain valuable compounds have been removed, but still contains residual impurities to cause handling and process problems. The present invention further processes the COG improving its quality by passing it through the bed of DRI formed in the reduction reactor, but in a manner that permits better overall control of the reduction process while accommodating the COG conditioning.

In a preferred embodiment, the discharge zone 14 includes a cooling gas loop that is formed by pipe 22, cooling zone 14, pipe 24, gas cooler 26, pipe 28 and compressor 30.

According to the present invention, a portion of the cooling gas effluent from cooling zone 14 is transferred from the cooling loop by means of pipe 31 to pipe 36 (which forms part of the reducing gas loop for the reduction zone 12). A controller 34 regulates the flow rate of the gas circulating through pipe 18 by means of control valve 20 and the amount of gas flowing through pipe 31 by means of control valve 32. Through such regulation by the controller 34, the amount of gas which may up-flow from the cooling zone to the reduction zone within reactor 10 is controlled, and preferably minimized. This is an important feature of the invention; because, in this way, the COG after being first fed to the cooling zone 14 and contacted therein with, and conditioned by, the moving bed of DRI is essentially all then transferred to the reduction loop via pipe 31 to subsequently be heated in a controlled manner and ultimately be injected into the reduction zone 12 as part of the recycled reducing gas. Without this control of the gas flow within reactor 10, the process conditions in the reduction zone and the cooling zone can not be set to the desired values of gas composition, flow and temperature suitable for the efficient reduction of the iron oxides particles and for producing good-quality DRI 65.

It has been found that the best results are achieved when the difference between the gas flow rate of the gas flowing through pipe 18 (F1) and the gas flow rate flowing through pipe 31 (F2) is in the range of about 100 and about 200 normal cubic meters (NCM) per ton of DRI produced (F1>F2), but preferably should be at least in the range of about 50 and about 300 normal cubic meters (NCM) per ton of DRI produced.

COG effluent from cooling zone 14 in pipe 24, has the following volume composition: about 48% hydrogen; about 41% methane; about 7% water; about 0.6% carbon monoxide; about 2% carbon dioxide; and about 1% nitrogen. The heavy hydrocarbons and the BTX have been cracked into useful reducing gasses by contact of the COG with the DRI and sulfur has also been removed from COG by the DRI. Therefore, gas effluent from the cooling zone 14 via pipe 31 can be safely transferred to the reduction loop without facing problems of carbon deposits and fouling of equipment, especially the gas heater, heat exchangers and compressors.

COG gas, after passing through cooling zone 14 flows, through pipe 31 and combines with reducing gas effluent from reduction zone 12 at pipe 36, which leads to compressor 38 and then on through pipe 40 to a $CO_2$ removal unit 42 (where a portion of the $CO_2$ 44 produced by the reduction reactions is removed to regenerate the reduction potential of the gas being recycled to reduction zone 12). The carbon dioxide removal may be effected by chemical absorption or by physical adsorption. Reducing gas, having now a low $CO_2$ content of about 3% flows through pipe 46 to a humidifier 48 where the water content in said gas is controllably increased to a higher level of about 6%. The humidified gas then flows through pipe 54 to heater 56, where its temperature is raised to above 850° C., preferably to about 900° C. and more preferably to about 950° C. Any suitable fuel from a source 80 may be used through pipe 82 for firing heater 56, which fuel may be supplemented with reducing gas purged from the reduction loop through pipe 78. The hot gas effluent from heater 56 is then combined with oxygen or oxygen-enriched air 62 from a suitable source 60. Partial combustion with oxygen raises the temperature of the reducing gas fed to reduction zone 12 to about a range of 1000° C. to 1050° C. The high-temperature reducing gas 58 reduces the iron-oxides-containing particles 63 (such as iron ore pellets) fed to the upper part of zone 12 to metallic-iron-containing DRI 65 which flows down the reactor at a regulated rate by means known in the art, and is discharged through the cooling/discharge zone 14.

Reducing gas 58 fed to reduction zone 12, after having reacted with iron-oxide-containing particles 63, is withdrawn from reactor 10 through pipe 64. The hot reducing gas passes through heat exchanger 66 where steam 68 is advantageously produced. Steam 68 may then be used in the operation of $CO_2$ removal unit 42. From heat exchanger 66, the reducing gas is led through pipe 70 to cooler 72, where the reducing gas is directly contacted with water 74 to cool down the gas temperature to below about 50° C. and also to wash out dust therefrom. Water produced by the reduction reactions in zone 12 is condensed in cooler 72 and is removed from the reducing gas thereby regenerating its reducing potential. Cooled gas flows through pipe 73 and is split in two portions. A major portion of the cooled gas is recycled via pipe 36, et seq., on to the reduction zone 12, thus dosing the reducing gas loop (and a minor portion is purged from said reducing gas loop via pipe 78 at a regulated rate by means of control valve 76). The purged gas from pipe 78 may be used as fuel to fire beater 56 via pipe 82 or for other purposes.

Hot water 75 is extracted from cooler 72 and is preferably utilized in humidifier 48 as feed water 50 with the advantage that its higher temperature contributes to raise the temperature of the reducing gas in humidifier 48 and therefore the amount of water added to the reducing gas can be controlled. The water content in the gas stream after humidification is typically between about 5% and about 10% by volume. Excess water of humidifier 48 is discharged through pipe 52. This feature has been described in U.S. Pat. No. 5,110,350.

Hot DRI is optionally cooled down from temperatures of about 800° C. to below 100° C. in cooling zone 14 before discharging DRI 65 from reactor 10. In this preferred embodiment, COG from source 16 is used as the cooling agent and advantageously is also cleared of heavy hydrocarbons and BTX, but it will be evident to those skilled in the art, that the invention may be also applied to reactors where the temperature of the DRI is not necessarily brought down to near-ambient temperature before discharging (such be when hot discharge for briquetting is desired). In this case, there would be no need of forming a cooling gas loop with cooler 26 and compressor 30 and COG could be passed once-through through zone 14 without recycling, and then COG would be transferred to the reduction zone 12 through pipe 31.

Figure 2:
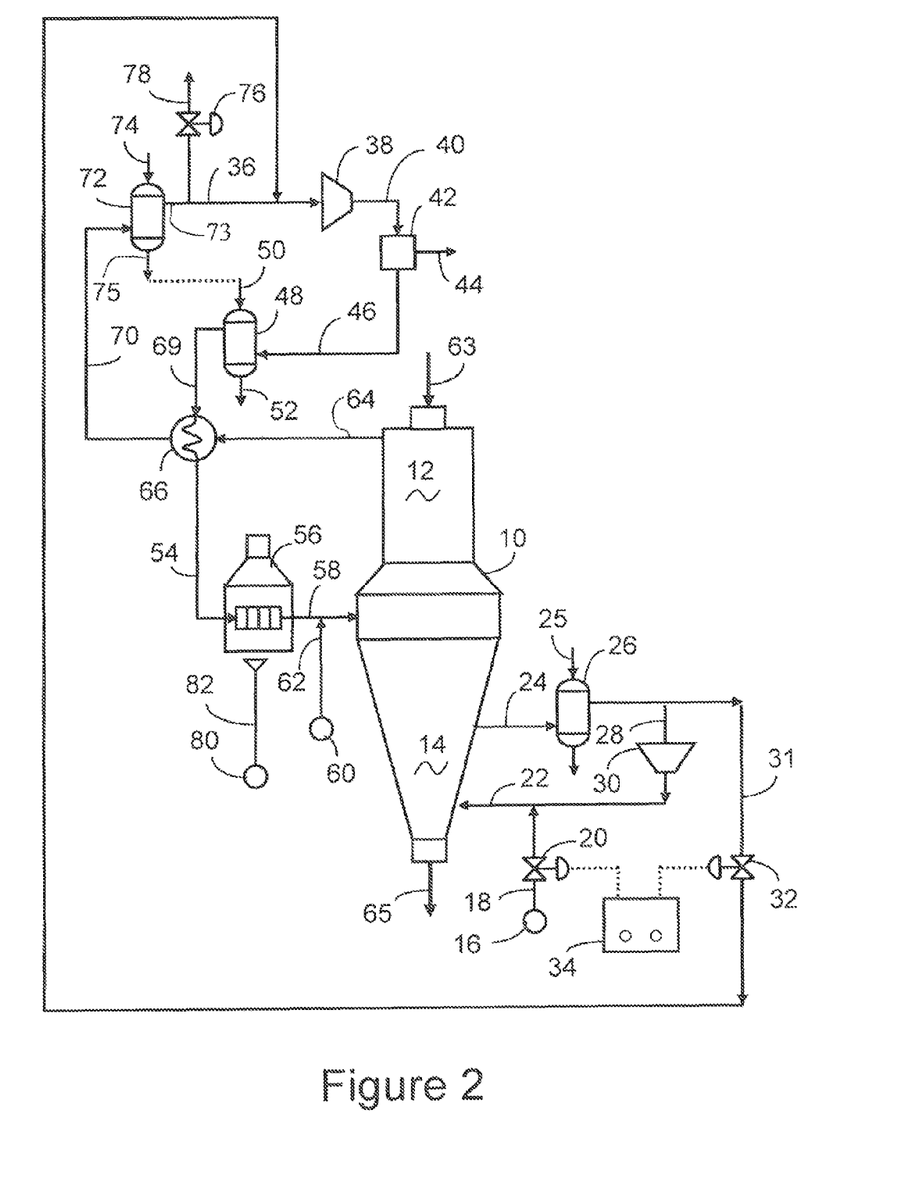
FIG. 2 shows a schematic process diagram wherein COG is utilized in a direct reduction process without a reformer and where the heat-content of the reducing gas effluent from the direct reduction reactor is used for preheating the reducing gas recycled to said reduction reactor.

Referring now to FIG. 2, the general process arrangement is similar to the process shown in FIG. 1 with the difference that a heat exchanger 66 is used to pre-heat the reducing gas received from the humidifier 48 via pipe 69, prior to being recycled on through heater 56 to the reduction zone 12. COG is fed from source 16 through the cooling zone 14 and then ultimately is transferred on to the reduction loop through pipe 31 in a similar operation as described above in relation to FIG. 1.

Figure 3:
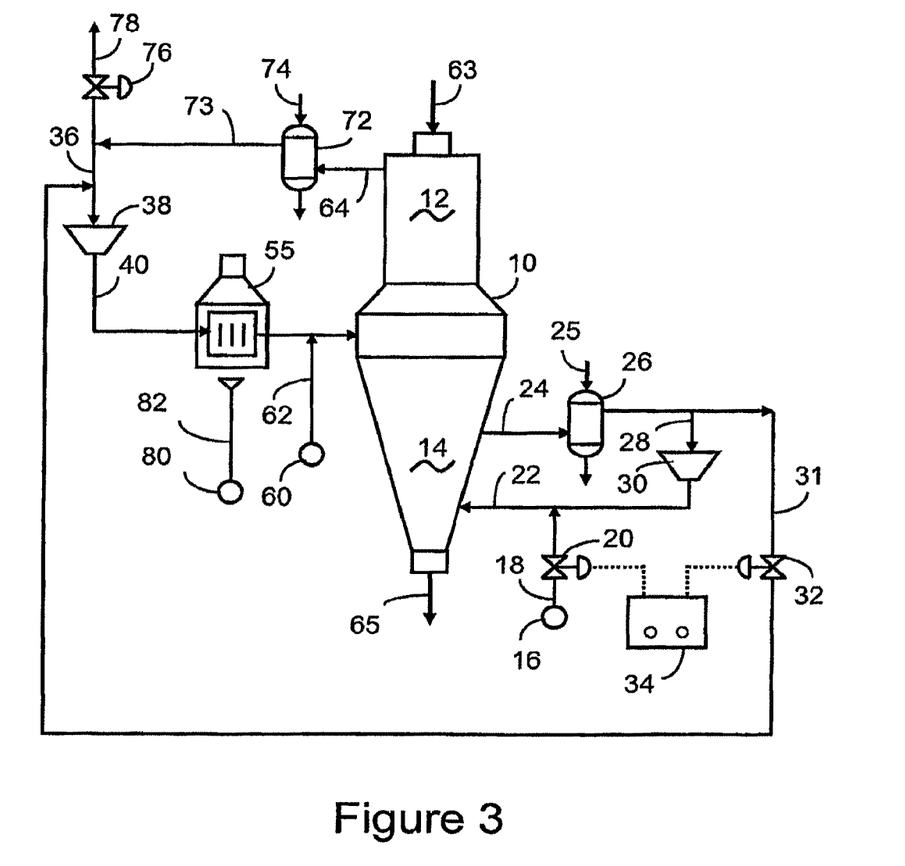
FIG. 3 shows a schematic process diagram wherein COG is utilized in a direct reduction process having a reformer in the reduction gas loop.

In FIG. 3, the direct reduction process shown is different from the processes of FIGS. 1 and 2, in that the reducing gas effluent from the reduction zone is recycled through a catalytic reformer 55 where methane-containing recycled gas is reformed with carbon dioxide formed in reduction zone 12 to yield hydrogen and carbon monoxide. COG is fed from source 16 through the cooling zone 14 and then ultimately is transferred on to the reduction loop through pipe 31 in a similar operation as described above in relation to FIG. 1.

Figure 4:
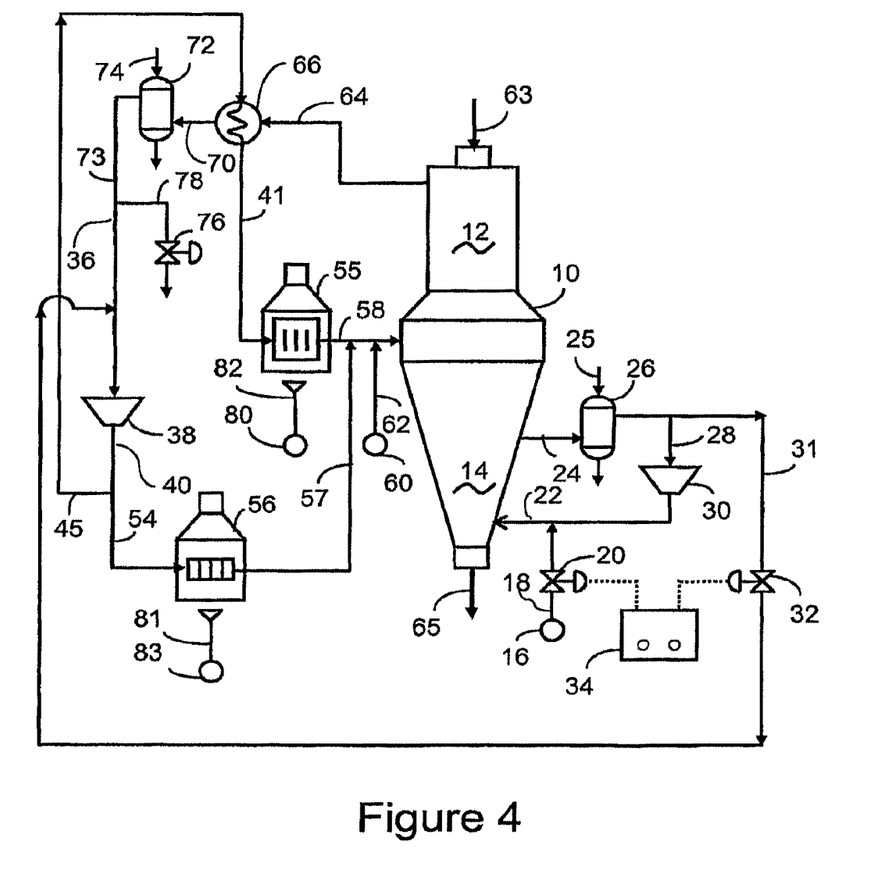
FIG. 4 shows a schematic process diagram wherein COG is utilized in a direct reduction process where a portion of the reducing gas effluent from the reduction reactor is recycled to the reduction reactor through a reformer, and another portion of said effluent gas is recycled through a gas heater.
Figure 5:
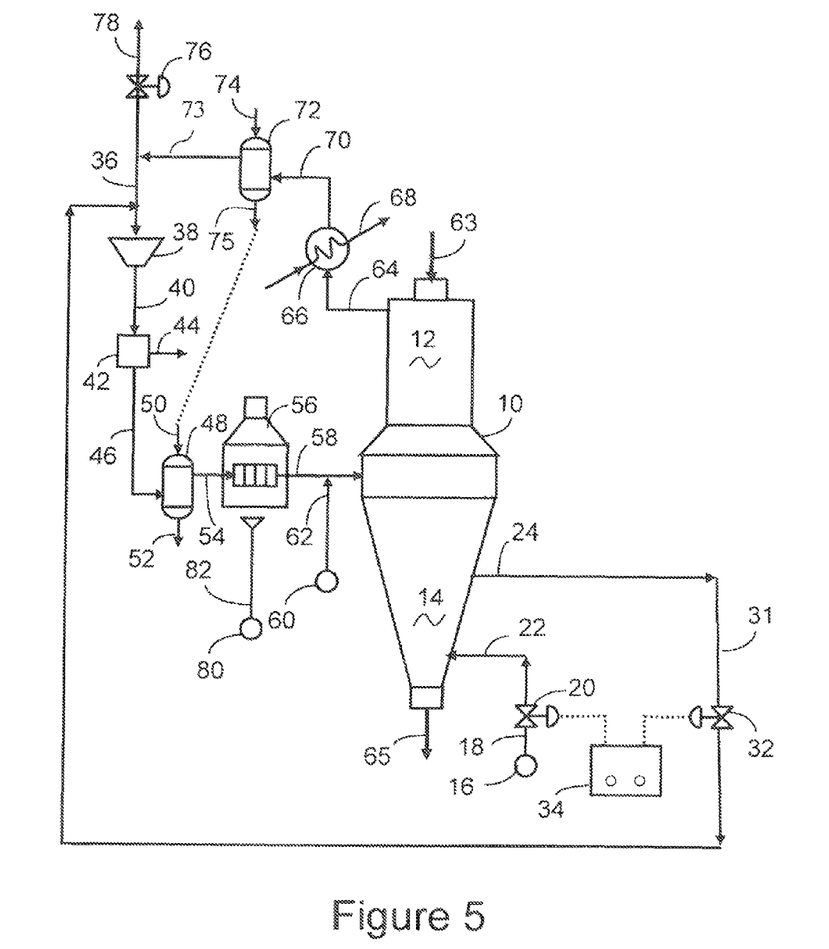
FIG. 5 is a schematic process diagram similar to that in FIG. 1, showing the same reactor modified only in that the discharge zone in the bottom of the reactor (unlike the reactors shown in the preceding Figures) does not include a cooling loop.

FIG. 4 shows a direct reduction process which combines in the reduction loop both a recycled gas heater 56 and a catalytic reformer 55 with an operation similar to the embodiments shown in FIGS. 1, 2 and 3. COG is fed from source 16 through the cooling zone 14 and then ultimately is transferred on to the reduction loop through pipe 31 in a similar operation as described above in relation to FIG. 1.

The present invention has been described with regard to a few preferred embodiments, but those skilled in the art will be readily capable of contemplating other variants which are deemed to be within the scope of the invention, which scope should be ascertained from the claims which follow.

What is claimed is:

1. A method for producing direct reduced iron (DRI) through the reduction of iron-oxides-containing particles to metallic iron-containing particles in a reduction reactor, comprising a reduction zone and a lower cooling discharge zone, by contacting said iron-oxides-containing particles with a high temperature reducing gas stream, comprising hydrogen and carbon monoxide in said reduction zone, and wherein the reduced particles now from said reduction zone down through said lower discharge zone; said method being characterized by the improvement comprising
   introducing into and circulating a methane-containing process gas in the form of coke oven gas containing benzene, toluene and xylene (BTX), tars and other contaminants through said lower zone including through the bed of direct reduced iron therein;
   withdrawing from the reactor at least a portion of the gas flowing in said lower zone;
   transferring externally of said reactor at least a first portion of such gas withdrawn from said lower zone;
   combining such first portion of said withdrawn gas with an at least partially regenerated reducing gas effluent being recycled back to the reduction zone;
   feeding such combined gases together into the reduction zone of said reactor; and
   controlling the flow rate of said methane-containing process gas so as to be greater than the flow rate of said transferred portion of said withdrawn gas by between about 50 normal cubic meters and about 300 normal cubic meters per metric ton of direct reduced iron produced in said reduction reactor.

2. A method according to claim 1, wherein said methane containing process gas is conditioned coke oven gas.

3. A method according to claim 2, wherein said gas withdrawn from said reactor out of said lower zone is cooled and cleaned, said first portion thereof is thereafter transferred externally, to said reducing gas effluent, and a second portion thereof, also cooled and cleaned, is recirculated back into the lower zone for cooling the DRI therein.

4. A method according to claim 3, wherein said methane containing process gas is merged with said second portion of the cooled and cleaned withdrawn gas, and the merged gases are thereafter fed together into the lower cooling discharge zone.

5. A method according to claim 4, wherein the flow rate of said methane-containing process gas is greater than the flow rate of said transferred portion of said withdrawn gas by between about 100 normal cubic meters and about 200 normal cubic meters per metric ton of direct reduced iron produced in said reduction reactor.

6. A method according to claim 4, wherein said reducing gas effluent from the reduction zone is regenerated at least by removal of water prior to being combined with said transferred first portion of said withdrawn gas.

7. A method according to claim 6, wherein the $CO_2$ removed is from said combined gases containing said reducing gas effluent.

8. A method according to claim 7, further comprising heating the combined gases containing said reducing gas effluent to over 850° C. prior to feeding into the reduction zone.

9. A method according to claim 8, wherein the water content of the combined gases is increased to a level between about 5% and about 10% by volume prior to heating.

10. A method according to claim 9, wherein said combined gases, after passing through said gas heater, are further combined with oxygen so as to raise the temperature to a range of between about 950° C. and 1050° C.

11. A method according to claim 4, wherein said reducing gas effluent from the reduction zone is regenerated at least by removal of $CO_2$ from said reducing gas effluent.

12. A method according to claim 2, wherein said methane containing process gas is introduced directly into said lower zone; and all of said gas withdrawn from said reactor out of said lower zone is transferred externally.

13. A method according to claim 1, wherein said methane-containing process gas is coke oven gas; wherein said gas withdrawn from said reactor out of said lower zone is cooled and cleaned, said first portion thereof is thereafter transferred externally, to said reducing gas effluent, and a second portion thereof, also cooled and cleaned, is recirculated back into the lower zone for cooling the direct reduced iron therein; and wherein said methane-containing process gas is merged with said second portion of the cooled and cleaned withdrawn gas, and the merged gases are thereafter fed together into the lower cooling/discharge zone.

14. A method according to claim 13, wherein said reducing gas effluent from the reduction zone is regenerated at least by removal of water prior to being combined with said transferred first portion of said withdrawn gas; and wherein $CO_2$ is removed from said combined gases containing said reducing gas effluent and said transferred gas.

15. A method according to claim 14, further comprising heating the combined gases containing said reducing gas effluent to over 850° C. prior to feeding into the reduction zone; and wherein the water content of the combined gases is increased to a level between about 5% and about 10% by volume prior to heating.

16. A method according to claim 15, wherein said combined gases, after passing through a gas heater, are further combined with oxygen so as to raise the temperature to a range of between about 950° C. and 1050° C.; and wherein the flow rate of said methane-containing process gas is greater than the flow rate of said transferred portion of said withdrawn gas by between about 100 normal cubic meters and about 200 normal cubic meters per metric ton of direct reduced iron produced in said reduction reactor.

17. A method according to claim 1, wherein said methane-containing process gas is introduced directly into said lower zone; and all of said gas withdrawn from said reactor out of said lower zone is transferred externally.

* * * * *